June 19, 1923.
A. M. BARRETT
LIFTING TRUCK
Filed Dec. 21, 1917
1,459,044
3 Sheets-Sheet 1
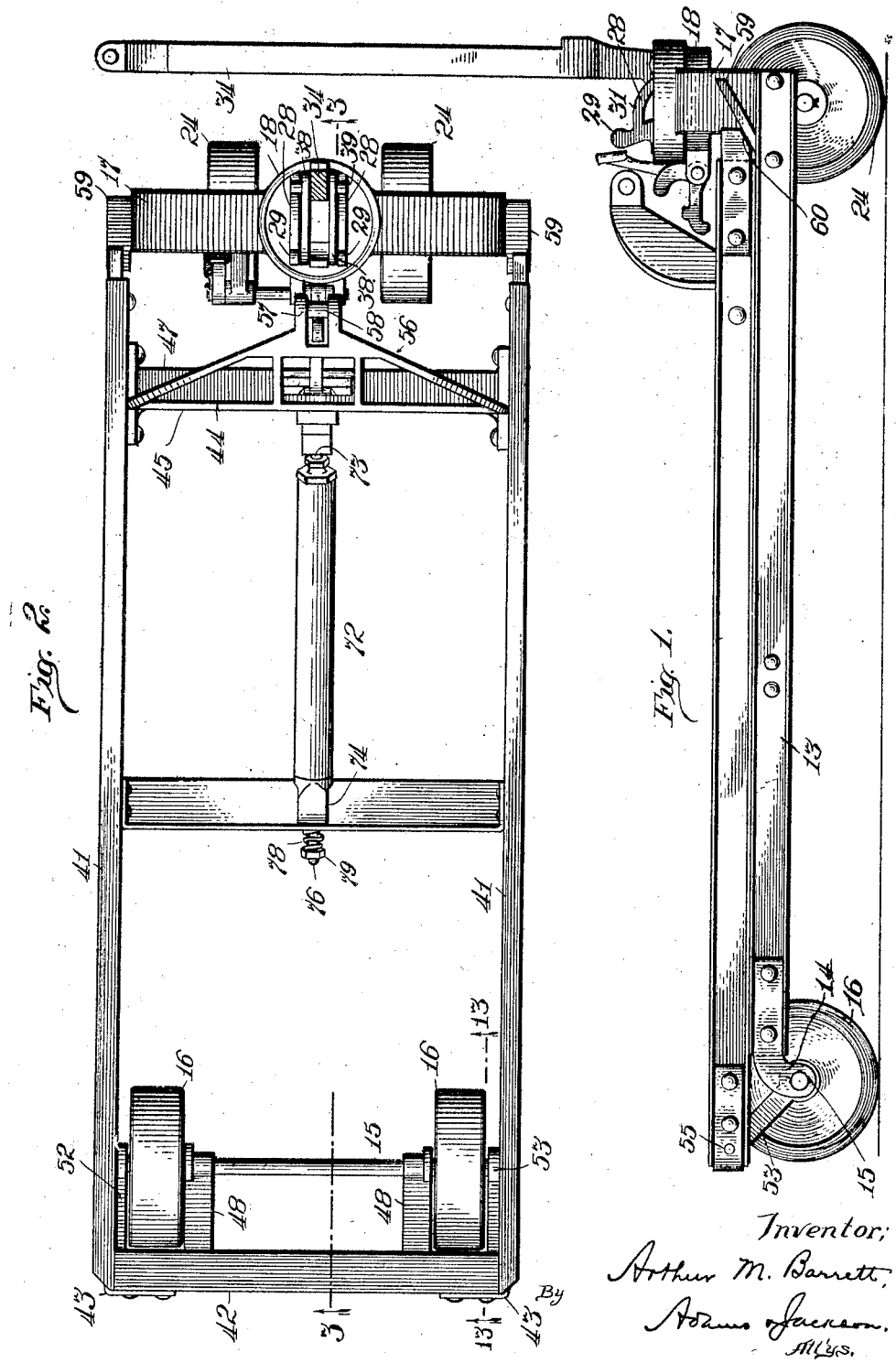
Inventor:
Arthur M. Barrett,
By Adams & Jackson
Attys.

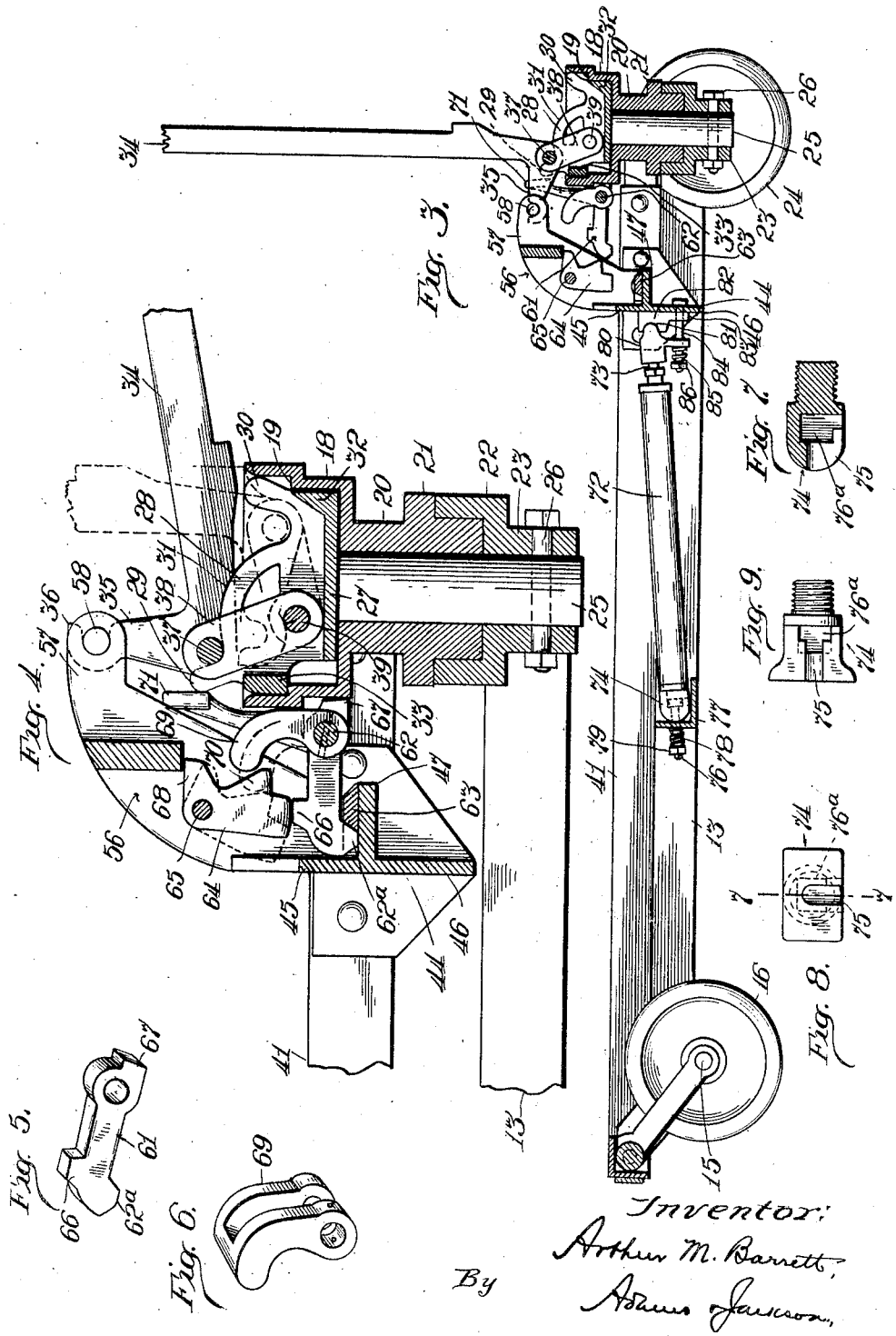
June 19, 1923.
A. M. BARRETT
LIFTING TRUCK
Filed Dec. 21, 1917
1,459,044
3 Sheets-Sheet 2

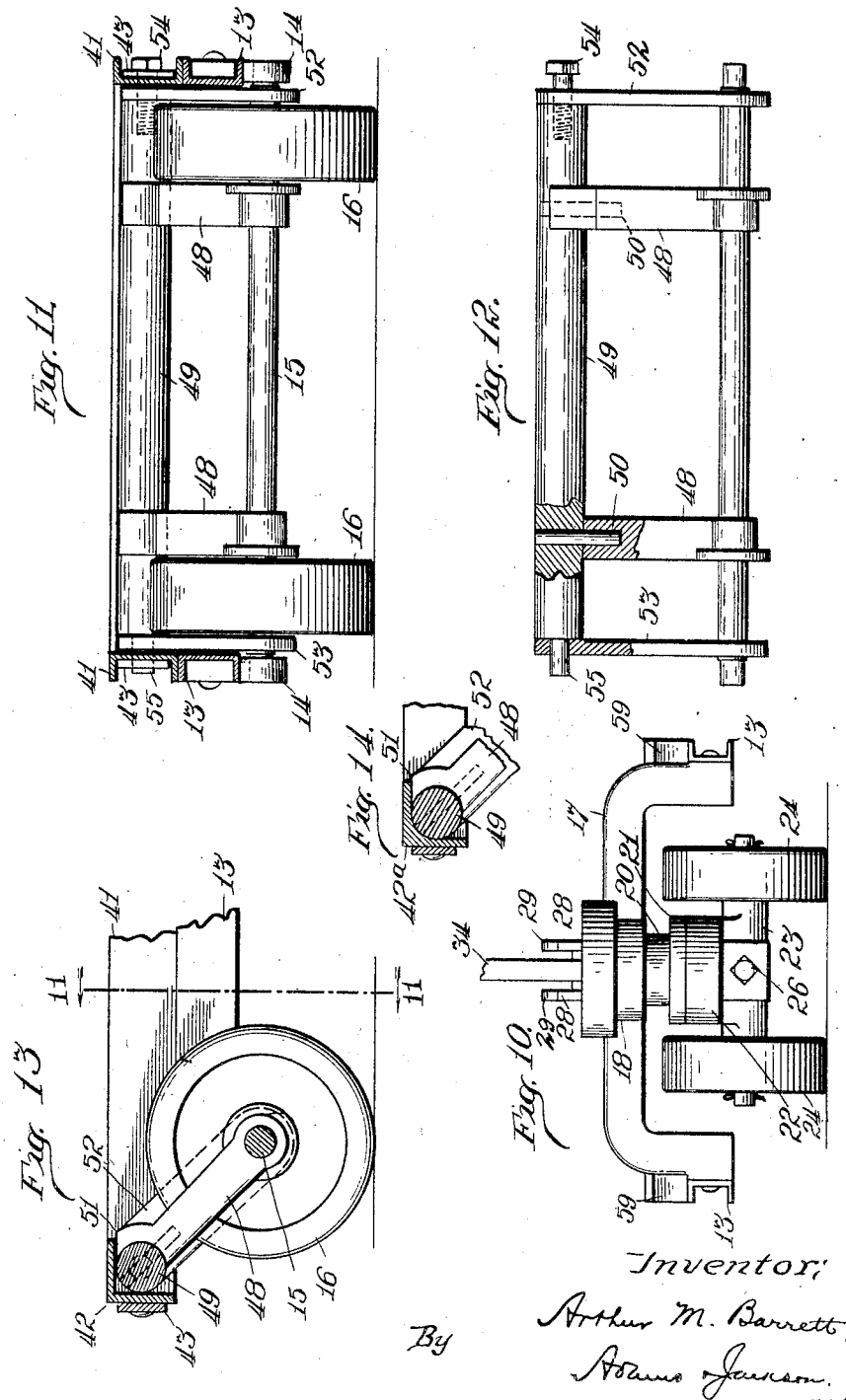

Patented June 19, 1923.

1,459,044

UNITED STATES PATENT OFFICE.

ARTHUR M. BARRETT, OF WINNETKA, ILLINOIS.

LIFTING TRUCK.

Application filed December 21, 1917. Serial No. 208,280.

*To all whom it may concern:*

Be it known that I, ARTHUR M. BARRETT, a citizen of the United States, residing at Winnetka, in the county of Cook and State of Illinois, have invented certain new and useful Improvements in Lifting Trucks, of which the following is a specification, reference being had to the accompanying drawings.

My invention relates to lifting trucks, or trucks comprising a rising and falling frame adapted to be introduced under a suitable platform or table on which a load is placed, and to be elevated to lift the platform and load so that it can be transported by means of the truck. Such trucks ordinarily consist of a main frame, rectangular in outline, which is supported on front and rear wheels, the front wheel or wheels being capable of being turned for steering purposes by means of a handle or lever, said lever being also employed for the purpose of raising and lowering the elevating frame. The latter frame conforms generally in outline to the shape of the main frame, and is supported by it in such manner that when moved longitudinally in one direction it will rise, and when moved in the opposite direction it will descend. A truck of this general character is shown in my Patent No. 1,308,750, dated July 8, 1919. The object of my present invention is to provide certain improvements in trucks of the type referred to, and particularly in the means for locking the elevating frame in its elevated position and for releasing it when it is to be lowered; in the mounting of the operating lever, and in the connections for the front steering wheels. I accomplish my object as illustrated in the accompanying drawings and as hereinafter described. What I regard as new is set forth in the claims.

In the accompanying drawings:

Fig. 1 is a side elevation of my improved truck;

Fig. 2 is a plan view thereof, the operating lever being in section;

Fig. 3 is substantially a longitudinal section on line 3—3 of Fig. 2;

Fig. 4 is an enlarged sectional view of the front portion of the truck as shown in Fig. 3, showing a changed position of the parts;

Fig. 5 is a perspective view of the latch by which the truck is held in its raised position;

Fig. 6 is a perspective view of the finger by which the elevating frame is released when it is to be lowered;

Fig. 7 is a detail, being a central longitudinal sectional view of the rear coupling of the fluid check on line 7—7 of Fig. 8;

Fig. 8 is an elevation of the forward end of said coupling;

Fig. 9 is an under side view of said coupling;

Fig. 10 is a front elevation of the truck, part of the operating lever being omitted;

Fig. 11 is a transverse section on line 11—11 of Fig. 13;

Fig. 12 is an elevation of the rear axle and the connections by which the rear end of the elevating frame is supported, certain parts being shown in section;

Fig. 13 is an enlarged detail, being a partial longitudinal section on line 13—13 of Fig. 2, and Fig. 14 is a similar longitudinal sectional view showing a modification.

Referring to the drawings;

13 indicates the side bars of the main frame of the truck, which as best shown in Fig. 10 are preferably made of channel iron. At their rear ends said bars are provided with downwardly curved hangers 14, shown in Fig. 1, in which are mounted the ends of the rear axle 15. 16 indicates the rear wheels which are mounted on the axle 15 near the side bars 13, as shown in Figs. 2 and 11.

The side bars 13 are connected at their front ends by an inverted U-shaped crosshead 17, as best shown in Fig. 10. As illustrated in Figs. 3 and 4, said cross-head is provided centrally at its upper side with a circular cup 18, the upper portion of which is offset to provide an internal ledge or shoulder 19. Co-axially disposed with reference to the cup 18 and extending downward therefrom is a cylindrical bearing or sleeve 20 having a peripheral flange 21 disposed intermediately thereof, as shown in Fig. 4. The lower end of said sleeve is adapted to fit into a socket in the upper end of a co-acting bearing block 22 provided at the upper side of the front axle 23, on the ends of which the front wheels 24 are mounted, as shown in Fig. 10. The sleeve 20 co-operates with the bearing block 22 to pivotally support the front axle so that the front wheels may be adjusted angularly as required in steering the truck. By this construction I provide extending bearing surfaces between these parts, since the upper margin of the bearing block 22 bears against the lower surface of the flange 21, and the lower end of the sleeve 20 bears against the bottom of the socket in said bearing block, while the periphery of said sleeve bears against the inner surface thereof. The bearing block 22 is held in place and is turned for steering purposes by means of a pivot, or king bolt 25, which extends down through the sleeve 20 and the bearing block 22, and is non-rotatably connected with said block by a bolt 26, shown in Fig. 4, or other suitable means. At its upper end the king bolt 25 carries a head 27 which rests on the bottom of the cup 18. Said head is provided with two upwardly projecting parallel brackets 28, the shape of which is best shown in Fig. 4. As there illustrated, said brackets are segmental in shape and are provided with projecting fingers 29—30 at their ends between which fingers the outer edges of the brackets are curved, as shown at 31. Adjacent to the fingers 30 the brackets 28 are connected by a transverse web 32, V-shaped in cross section, and adjacent to the fingers 29 they are connected by a cross-bar 33 which rests on the shoulder 19 and bears thereon as the king bolt 25 is turned in one direction or the other.

34 indicates the operating lever or handle which is substantially a bellcrank lever, being provided at its lower end with an arm 35 which is approximately at right angles to the main portion of said lever, as shown in Fig. 4. The arm 35 is provided with a hook 36 which is adapted to engage a portion of the elevating frame for raising and lowering the same, as will be hereinafter described. The lower end of the lever 34 is mounted between the brackets 28 on a pivot 37 which is adapted to ride on the curved outer edges 31 of said brackets to permit the lever 34 to be shifted into either of two positions, one of which it occupies when used to raise or lower the elevating frame, and the other of which it occupies when used for moving the truck from place to place and steering it. The lever 34 is connected with the head 27 and is held in operative relation to the brackets 28 by a pair of links 38 disposed between said brackets and the opposite sides of the lever, and connected with the pivot 37 and with another pivot 39 mounted between said brackets, as shown in Fig. 4.

It will be apparent from the foregoing description that by swinging the lever 34 laterally, the king bolt 25 may be rotated in one direction or the other, correspondingly turning the front wheels so that the truck may be steered. When this occurs, the head 27 turns in the cup 18, the bar 33 riding on the shoulder 19. The engagement of said bar with said shoulder is advantageous because it provides a firm support for the ends of the brackets 28 when the lever 34 is used to raise and lower the load, and it also aids in supporting said brackets when the truck is steered. When not in use the lever 34 may be supported in a substantially upright position so that it will be out of the way by moving its fulcrum 37 to its extreme forward position, which will permit the lever arm 35 to rest on the pivot 39, as shown in dotted lines in Fig. 4. When in such position, the hook 36 moves down in front of the cross-bar 33, as there illustrated.

41 indicates the side bars of the elevating frame which are preferably channel bars, as shown in Fig. 11, and are disposed so that they overlie the side bars 13 of the main frame. The side bars 41 are connected at their rear ends by a cross-bar 42 which also serves as a bearing, as will be hereinafter described. Said cross-bar may be made of either a simple angle iron, as shown in Fig. 13, or it may be an angular bar having its inner side rounded, as shown at 42$^a$ in Fig. 14. In the construction shown, the cross-bar 42 is connected with the side bars 41 by straps 43, but it may be connected therewith in any other suitable way, as by welding. 44 indicates a front cross-bar which is preferably T-shaped in cross section, being provided with vertical flanges 45—46 and a horizontal flange 47, shown in Figs. 3 and 4. This front cross-bar is fixedly connected with the side bars 41 near their forward ends and serves to brace said bars as well as to perform various other functions, as will hereinafter appear. 48 indicates links which are mounted upon the rear axle 15 between the wheels 16, as shown in Fig. 11, and support at their upper ends a cylindrical bearing member 49, which, in the construction shown, is non-rotatably secured thereto by pins 50, as illustrated in Fig. 12. Said cylindrical member may, however, be formed integral with the links 48 or be otherwise operatively connected therewith. Said cylindrical member 49 is of suitable diameter to fit into the angle of the cross-bar 42 so as to bear against the horizontal and vertical flanges thereof, as shown in Fig. 13, or against the inner curved surface thereof, if such cross-bar be made as shown in Fig. 14, so that when the links 48 are swung forward about the rear axle 15 as a pivot, the co-acting surfaces of the cylindrical member 49 and the cross-bar 42 or 42$^a$, provide an extended bearing between said members, thereby not only reducing wear, but also furnishing a more stable support for the rear end of the elevating frame. In order to permit the links 48 to assume the necessary inclined position when the elevating frame is lowered, said links are flattened as shown at 51 in Fig. 13, this flattened portion being adapted to underlie and bear against the under surface of the horizontal web of the cross-bar 42 when the elevating frame is down, so that said links serve as stops to limit the downward movement of the elevating frame and also aid in supporting it when it is in its lowered position. In addition to the links 48, the cylindrical bearing member 49 is connected to the rear axle 15 by links 52—53 which are fitted upon the ends of the axle 15 outside of the rear wheels, as shown in Fig. 13. Preferably the link 52 is connected with one end of the member 49 by a bolt 54 passed through the adjacent side bar 41 and screwed into the end of the member 49, as indicated by dotted lines in Fig. 12, and the link 53 is secured to the opposite end of said member 49 by fitting it upon a pin 55 which projects from that end of said member 49 and into a suitable socket in the opposite side bar 41, as shown in Figs. 11 and 12.

56 indicates a bracket carried by the side bars 41 near their forward ends, and preferably cast integral with the cross-bar 44. Said bracket is substantially V-shaped, its apex extending upward and forward and being provided with a yoke 57 in which is mounted a cross-pin 58 which is adapted to be in alinement with the hook 36 of the operating lever 34 when said lever is in its central or neutral position, at which time, the front wheels are disposed parallel with the rear wheels, as illustrated in Fig. 2. The arrangement of these parts is such that when the elevating frame is in its lowered position, by moving the pivot 37 of the operating lever 34 to its rearmost position on the brackets 28 and swinging said lever upward to a substantially vertical position, as illustrated in Fig. 3, the hook 36 may be brought into engagement with the pin 58. By then swinging the lever downward, it will operate to lift the elevating frame and pull it forward until it assumes the position shown in Fig. 4. The links 38 will then assume a rearwardly inclined position, the fulcrum 37 lying back of the pivot 39 and the pin 58 being approximately vertically above the fulcrum 37, so that the weight of the elevating frame when it is being lifted as well as when it is approximately in its raised position, tends to hold the fulcrum of the operating lever in its lifting position, but it may readily be swung forward on the brackets 28 to the position shown in dotted lines in Fig. 4 after the hook 36 has been disengaged from the pin 58. The elevating frame is caused to rise when the lever 34 is operated in the manner described, by the swinging of the links 48, 52 and 53 in a clockwise direction about the rear axle 15 as an axis and the swinging of the lever arm 35 about the fulcrum 37. For supporting and guiding the front end of said frame when it is lowered without using the lever 34, inclined planes 59 are provided at the sides of the cross head 17 in position to be engaged by the forward ends of the side bars 41 of the elevating frame, which are bevelled as shown at 60 in Fig. 1. Thus when the locking devices, hereinafter described, by which the elevating frame is held in its raised position are released, the rear end of said frame is lowered by the swinging of the links 48, while its forward end slides down the inclined guides 59, so that said frame maintains approximately a substantial horizontal position as it rises or descends.

The elevating frame is secured in its elevated position by means of a latch 61 which is loosely mounted upon a transverse shaft 62 arranged in suitable bearings back of the head 18, as shown in Figs. 2 and 4. Said latch is located in about the center line of the truck and extends rearwardly from said shaft. On its under side, it is provided with a bevelled tooth 62ª which is adapted to engage a bevelled block 63 which, in the construction shown, is carried by the horizontal flange 47 in such position that when the elevating frame is in its uppermost position, the tooth 62ª will engage the block 63 and lie between it and the vertical flange 45, as illustrated in Fig. 4. It will be apparent that inasmuch as the elevating frame 41 cannot descend without moving rearwardly, if the latch 61 be held down in operative relation to the block 63, the elevating frame will be locked in its raised position. For the purpose of holding said latch down in operative position, a swinging dog 64 is provided, which is suspended from a suitable pivot 65, so that when the elevating frame is in its raised position, it will overlie the upper side of the latch 61 and be adapted to engage an upwardly projecting lug 66 provided at the upper side of said latch, as shown in Fig. 4. The arrangement is such that when the dog 64 is in the position shown in said figure, its lower end will engage the lug 66 and hold the latch down in operative position, but by swinging the dog 64 to the position shown in dotted lines in Fig. 4, the latch 61 will be free to swing upward and permit the elevating frame to descend. The latch 61 is normally held in a substantially horizontal position by a shoulder 67 which projects forward from the shaft 62 and is adapted to engage the head 18, or some other fixed part, when the latch 61 is in approximately a horizontal position. The face of said shoulder is slightly bevelled to permit the latch to swing upward to a limited extent. The dog 64 preferably maintains its operative position shown in Fig. 4 by gravity, and to limit its forward movement it is provided with a lug 68 which is adapted to engage a part of the bracket 56 when said dog occupies its vertical position. Said dog is swung rearwardly to the position shown in dotted lines in Fig. 4, for the purpose of releasing the latch 61, by means of an arm 69 which is mounted on and secured to the shaft 62 in position to engage a forwardly projecting lug 70 carried by the dog 64, as shown in Fig 4. By rocking the shaft 62 to move the arm 69 in a counterclockwise direction, it will engage the lug 70 and move the dog 64 away from over the latch 61, as illustrated in dotted lines. The shaft 62 is rocked by means of a foot lever 71, shown in Figs. 2 and 4, which is normally held in its forward position by gravity, but if desired a spring may be used for that purpose.

When the elevating frame is in its lowered position shown in Fig. 3, the dog 64 does not overlie the latch 61, but as said frame is lifted it moves forward as has been described, until, when the elevating frame reaches its highest position, said dog is carried over said latch into operative position, as shown in Fig. 4. Before said dog reaches its operative position, however, the forward bevelled edge of the block 63 engages the rearward bevelled edge of the tooth 62ª and lifts the latch 61 sufficiently to permit it to ride over the block 63 and drop into the space between said block and the flange 45, as shown in Fig. 4. The dog 64 then swings over the latch 61 and locks the elevating frame in its raised position.

In order to check the descent of the elevating frame when loaded, I provide a check 72 interposed between said elevating frame and the main frame. Said check comprises a cylinder in which operates a piston having a piston rod 73, which is drawn out by the elevation of the elevating frame and is forced back into the cylinder by the descent of said frame. The interior construction of the check has nothing to do with my present invention further than that it should be a fluid check of any approved type, and preferably provided with a spring to start the descent of the elevating frame when it is not loaded. Such checks are well known in the art, and have for many years been used in connection with doors, and therefore, the interior construction of the check need not be described, but I provide an improved mounting for the check which enables it to accommodate itself to the peculiar movement of the elevating frame without undue wear, as will now be described.

74 indicates a coupling which is provided at the rear end of the check, and is preferably secured thereto by screwing it into the rear end of the cylinder of the check, as shown in Fig. 9. Said coupling is provided with a slot 75 on its under side which is adapted to receive the head and the adjacent portion of a bolt 76, and it is also provided with a recess 76ª into which the head of the bolt may fit, as shown in dotted lines in Figs. 3 and 9. Said bolt passes through a suitable opening in a cross-brace 77 which connects the side members 13 of the main frame, and is preferably located about midway of the length of the main frame, as shown in Fig. 3. The brace 77 is preferably of angle iron, and the outer portion of the coupling 74 is rounded so that it bears against the vertical flange of said brace and is adapted to rock thereon. A spring 78 is mounted on the bolt 76 at the opposite side of said vertical flange, and between said flange and a nut 79 screwed upon the rear end of said bolt. Thus the coupling 74 is yieldingly held with a rocking bearing against the brace 77, and any wear is taken up by the action of the spring 78. The forward end of the piston rod 73 is connected to another coupling 80, having a rounded head 81 which fits in a socket in a bearing block 82 which is secured to the flange 46 in any suitable way. I thus provide a rocking bearing for supporting the forward end of the piston rod. The coupling 80 is provided with a depending lug 83, and a bolt 84 passes through said lug and through the flange 46, said bolt carrying a spring 85 which bears against the lug 83 and a nut 86 mounted on the rear end of the bolt 84, so that said spring exerts a yielding forward pressure on the lug 83 which tends to swing the coupling 80 in a counterclockwise direction. The coupling 80, therefore, accommodates itself to the changing angle of the check resulting from the rising and falling of the elevating frame, and consequently not only reduces the wear on the forward connection of the piston rod, but also maintains the piston rod in proper alinement with the cylinder of the check, thereby avoiding excessive wear on the stuffing-box at the forward end of said cylinder.

While in the foregoing specification I have described in detail the specific embodiment of my invention illustrated in the drawings, I wish it to be understood that by so doing I have not intended to limit my invention to such specific construction, as many modifications will readily occur to those skilled in the art. The claims hereinafter made are therefore to be construed generically except in so far as they are directed to specific features of the construction shown and described.

What I claim as my invention, and desire to secure by Letters Patent, is,—

1. A lifting truck comprising main and elevating frames, a cross-head at the forward end of said frame, a centrally-disposed tubular bearing member depending from said cross-head and having an intermediate peripheral flange, a bearing block fitted upon the lower end of said bearing member and engaging said flange, wheels carried by said bearing block, a king bolt connected to said bearing block and extending up through said bearing member, and means connected with the upper end of said king bolt for raising said elevating frame and for rotating said king bolt to steer said wheels.

2. A lifting truck comprising main and elevating frames, a cross-head at the forward end of said main frame, a king bolt fitted in said cross-head, wheels connected with said king bolt, a movable support mounted on said king bolt, and a lever fulcrumed on said support and adapted to be operated to raise the elevating frame and to steer the truck.

3. A lifting truck comprising main and elevating frames, a cross-head at the forward end of said main frame, a king bolt fitted in said cross-head, wheels connected with said king bolt, a swinging support mounted on said king bolt, and a lever fulcrumed on said support and adapted to be shifted with relation to said king bolt into or out of operative relation to said elevating frame.

4. A lifting truck comprising main and elevating frames, a cross-head at the forward end of said main frame, a king bolt fitted in said cross-head, wheels connected with said king bolt, swinging links mounted on said king bolt, and a lever fulcrumed on said links and movable by the swinging thereof into or out of operative relation to said elevating frame.

5. A lifting truck comprising main and elevating frames, a cross-head at the forward end of said main frame, a king bolt fitted in said cross-head, wheels connected with said king bolt, a movable support mounted on said king bolt, a lever fulcrumed on said support and movable into or out of operative relation to said elevating frame, and guiding means for said fulcrum carried by said king bolt.

6. A lifting truck comprising main and elevating frames, a cross-head at the forward end of said main frame, a king bolt fitted in said cross-head, wheels connected with said king bolt, a movable support mounted on and turning with said king bolt, a lever fulcrumed on said support, said lever being movable with reference to said king bolt into and out of operative relation to said elevating frame, and parallel brackets carried by said king bolt at the opposite sides of said lever, said brackets having guides for the fulcrum of said lever.

7. A lifting truck comprising main and elevating frames, a cross-head at the forward end of said main frame, said cross-head having a central cup in the upper surface thereof, a centrally-disposed tubular bearing member depending from said cross-head, a bearing block co-operating with said tubular member, a king bolt fitted in said tubular member and having a head fitted in said cup, said king bolt being connected with said bearing block, wheels connected with said bearing block, brackets on the head of said king bolt, and a lever mounted between and fulcrumed on said brackets, said lever being adapted to be operated to raise said elevating frame and to steer the truck.

8. A lifting truck comprising a main frame, an elevating frame arranged to move longitudinally when it is moved vertically, a latch adapted to hold said elevating frame against longitudinal movement when the same is in its elevated position, means for locking said latch in operative position and means mounted on said main frame for raising said elevating frame and moving it longitudinally.

9. A lifting truck comprising a main frame, an elevating frame arranged to move longitudinally when it is moved vertically, a latch carried by said main frame and adapted to hold said elevating frame against longitudinal movement when the same is in its elevated position, means for locking said latch in operative position and means mounted on said main frame for raising said elevating frame and moving it longitudinally.

10. A lifting truck comprising a main frame, an elevating frame arranged to move longitudinally when it is moved vertically, a latch carried by said main frame and adapted to hold said elevating frame against longitudinal movement when the same is in its elevated position, means carried by said elevating frame for locking said latch in operative position and means mounted on said main frame for raising said elevating frame and moving it longitudinally.

11. A lifting truck comprising a main frame, an elevating frame arranged to move longitudinally when it is moved vertically, a latch carried by said main frame and adapted to hold said elevating frame against longitudinal movement when the same is in its elevated position, means carried by said elevating frame for locking said latch in operative position, means mounted on said main frame for raising said elevating frame and moving it longitudinally and a lever for releasing said locking means.

12. A lifting truck comprising a main frame, an elevating frame arranged to move longitudinally when it is moved vertically, a latch adapted to hold said elevating frame against longitudinal movement when said frame is in its elevated position, a pivotally mounted dog co-operating with said latch to hold the same in operative position and means mounted on said main frame for raising said elevating frame and moving it longitudinally.

13. A lifting truck comprising a main frame, an elevating frame arranged to move longitudinally when it is moved vertically, a latch adapted to hold said elevating frame against longitudinal movement when said frame is in its elevated position, a pivotally mounted dog carried by said elevating frame and co-operating with said latch to hold the same in operative position and means mounted on said main frame for raising said elevating frame and moving it longitudinally.

14. A lifting truck comprising a main frame, an elevating frame arranged to move longitudinally when it is moved vertically, a latch adapted to hold said elevating frame against longitudinal movement when said frame is in its elevated position, a pivotally mounted dog co-operating with said latch to hold the same in operative position, means mounted on said main frame for raising said elevating frame and moving it longitudinally and a lever for moving said dog to release said latch.

15. A lifting truck comprising a main frame, an elevating frame arranged to move longitudinally when it is moved vertically, a latch adapted to hold said elevating frame against longitudinal movement when said frame is in its elevated position, a pivotally mounted dog carried by said elevating frame and co-operating with said latch to hold the same in operative position, means mounted on said main frame for raising said elevating frame and moving it longitudinally and a lever for moving said dog to release said latch.

16. A lifting truck comprising a main frame, an elevating frame arranged to move longitudinally when it is moved vertically, a horizontally-disposed latch having a bevelled tooth adapted to engage said elevating frame when the latter is in its elevated position to hold the same against longitudinal movement, a swinging dog for holding said latch in operative position and means mounted on said main frame for raising said elevating frame and moving it longitudinally.

17. A lifting truck comprising a main frame, an elevating frame arranged to move longitudinally when it is moved vertically, a horizontally-disposed latch having a bevelled tooth adapted to engage said elevating frame when the latter is in its elevated position to hold the same against longitudinal movement, a swinging dog carried by the elevating frame for holding said latch in operative position, said dog being movable into operative position over said latch by the elevation of the latter frame and means mounted on said main frame for raising said elevating frame and moving it longitudinally.

18. A lifting truck comprising a main frame, an elevating frame arranged to move longitudinally when it is moved vertically, a horizontally-disposed latch having a bevelled tooth adapted to engage said elevating frame when the latter is in its elevated position to hold the same against longitudinal movement, a swinging dog for holding said latch in operative position, a lever mounted on the main frame, means actuated by said lever for moving said dog out of operative position and means mounted on said main frame for raising said elevating frame and moving it longitudinally.

19. A lifting truck comprising a main frame, an elevating frame arranged to move longitudinally when it is moved vertically, a horizontally-disposed latch having a bevelled tooth adapted to engage said elevating frame when the latter is in its elevated position to hold the same against longitudinal movement, a swinging dog carried by the elevating frame for holding said latch in operative position, said dog being movable into operative position over said latch by the elevation of the latter frame, a lever mounted on the main frame, means actuated by said lever for moving said dog out of operative position and means mounted on said main frame for raising said elevating frame and moving it longitudinally.

20. A truck comprising a main frame, a steering wheel connected therewith, an elevating frame movably mounted on said main frame, a lever adapted to be operated to engage said elevating frame to lift the same, a movable support on which said lever is fulcrumed, whereby said lever may be moved into and out of position to engage said elevating frame, and connections whereby said steering wheel may be guided by said lever.

21. A truck comprising a main frame, a steering wheel connected therewith, an elevating frame movably mounted on said main frame, a lever adapted to be operated to engage said elevating frame to lift the same, a swinging support on which said lever is fulcrumed, whereby said lever may be moved into and out of position to engage said elevating frame, and connections whereby said steering wheel may be guided by said lever.

ARTHUR M. BARRETT.